Nov. 10, 1970    W. HELGELAND    3,539,309
CIRCUIT COMPONENT MACHINING
Filed July 11, 1967
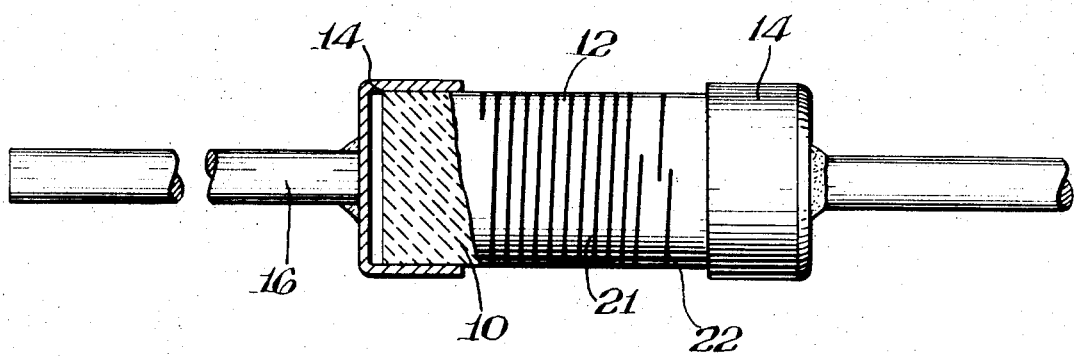

3,539,309
CIRCUIT COMPONENT MACHINING

Walter Helgeland, Nashua, N.H., assignor to Sprague Electric Company, North Adams, Mass., a corporation of Massachusetts
Continuation-in-part of applications Ser. No. 544,731, Apr. 25, 1966; Ser. No. 618,370, Feb. 24, 1967; and Ser. No. 628,911, Apr. 6, 1967. This application July 11, 1967, Ser. No. 652,451
Int. Cl. G01r; G05f; H01h
U.S. Cl. 29—593          6 Claims

ABSTRACT OF THE DISCLOSURE

Film type electric circuit components such as resistors, inductors, and capacitors, have their electric characteristics adjusted by machining out portions of their film with an electron beam in two stages, permitting the component to cool down and/or be exposed to the atmosphere between stages to improve the accuracy with which the machining can be terminated by automatic controls. Where the film is copper, it can be applied over a stratum of chromium or chromium-nickel which, though even much thinner than the copper film will cause the machining to leave straighter and sharper edges as it cuts through the copper.

---

This application is in part a continuation of previous applications Ser. No. 544,731 filed Apr. 25, 1966, Ser. No. 618,370 filed Feb. 24, 1967, and Ser. No. 628,911 filed Apr. 6, 1967.

The present invention relates principally to the electron beam machining of electric circuit components such as resistors, inductors and capacitors.

Among the objects of the present invention is the provision of novel machining techniques and component constructions that are of improved accuracy and usefulness.

The foregoing as well as additional objects of the present invention will be more fully understood from the following description of several of its exemplifications, reference being made to the accompanying drawings wherein the figure is a partly broken away plan view of a resistor made pursuant to the present invention.

It has been discovered that particularly accurate electron beam machining of circuit components is obtained when the component is exposed to the atmosphere after at least about ¾ of the machining is completed and before the last of the machining is effected. An increase in machining accuracy is also obtained when the partly machined component is permitted to cool down, if the electron beam causes the bulk of the component to get very hot during the machining. Here however the cooling is best practiced after the machining is at least 90% completed and before the last of the machining.

The foregoing techniques are partciularly desirable for use with automatic control equipment that terminates the machining within a few milliseconds of the moment when the electrical characteristic of the machined component attains the desired value. Several types of such control equipment are described in applications Ser. No. 544,731 and 628,911, the contents of which are incorporated in the present description as though fully set forth herein, and with such equipment highly accurate machining can be carried out at a rate as high as 200 inches per second or higher.

The figure illustrates a cylindrical metal-film resistor made with a cylindrical ceramic core 10 which is shown as solid but could also be hollow, on the outer surface of which is a metal film 12 of a nickel-chromium alloy. At each end of the core 10, metal end caps 14 are crimped over the metal film 12 and act as terminal connectors for the resistor. Where the metal film 12 is relatively thin, as for example thin enough to have a resistivity of 200 or more ohms per square, it is preferred to improve the electrical connection between the end caps and the film by locally applying either above or under the film 12 a more highly conducting film of metal such as gold. Terminal leads 16 can be welded to the respective end caps 14 for convenience in connecting the resistor into the desired circuit.

The making of the resistor is described in the above identified earlier patent applications as well as in applications Ser. No. 397,979 filed September 21, 1964 (now U.S. 3,375,342 issued Mar. 26, 1968) and 354,649 filed Mar. 25, 1964 (now abandoned). These resistors have their metal film 12 machined out along a helical path indicated by 21 by an electron beam so as to increase the electrical length of the film between the end caps, thus greatly increasing the electrical resistance of the resistor. The path so machined can be as little as two or three mils wide with the turns of the machined out path three to five mils apart so that a great many turns can be crowded into a resistor whose overall length between the outer ends of the end caps 14, is as little as ¼ to ⅛ inch.

The electron beam machining is conducted in an evacuated chamber in which the pressure is generally about 0.1 millimeter of mercury, or less. At higher pressures the efficiency of the electron beam is reduced and it is furthermore difficult to focus the beam to a spot narrow enough to provide the high electron density needed for rapid machining. At a pressure of 0.1 millimeters of mercury for example, a 150-microampere electron beam from a 20-kilovolt source and focused to a three mil spot so rapidly machines through an 80% chromium-20% nickel film of 2,000 ohms per square resistivity, that very effective helixing is carried out on automatic equipment at a machining speed of about 200 inches per second. In fact with this type of operation the beam will also glaze the surface of the ceramic exposed at the machined track, thus providing a resistor that has somewhat better operation characteristics. It is preferred to use a core 10 that has an unglazed surface on which the metal film 12 is deposited as by vacuum condensation, inasmuch as the film anchors itself much more securely on an unglazed ceramic surface than on a glazed one. However, the film can also be applied on a glazed ceramic surface where adhesion is not a serious problem and it is desired to have the film of smooth nature, such as when it is so thin its resistivity exceeds 2,000 ohms per square.

While there is no difficulty in accurately machining the helix with the help of the automatic control equipment referred to above so that accuracy of plus or minus ⅒th of 1% of the resistance value is obtained, this accuracy drops off substantially as the machining speed is increased and as the resistors are made more compact. The machining of 12 turns along a ⅛ inch length of cylindrical body having a ¹⁄₁₆th inch diameter at the rate of 100 inches or more per second generally results in variations of more than plus or minus 1% even with the best automatic controls available and the most refined adjustments. Reducing the machining rate to as little as 20 inches per second sharpens the tolerance somewhat but still leaves it very high. At 200 inches of machining per second even resistors one inch long will have tolerances close to plus or minus 1%.

According to the present invention the machining of track 21 is carried out preferably to the point where the resistance has reached 95% of the desired value; the machining is then stopped, the incompletely machined resistor exposed to the air and permitted to cool down, and then the machining is completed by cutting a second track 22 into the film 12 with the automatic controls set to produce the desired resistance value. Using this type of operation the tolerance range of even the tiniest resistors machined at 200 inches per second or less turns out to be about plus or minus $2/10$ of 1%, with the bulk of the resistors in the plus or minus $1/10$ percent bracket.

While the electron beam current has a total energy of only a few watts, and the entire machining time to reach 100% of the desired value in one step is less than a second, the compact arrangement fo the machining track turns and the small size of the resistor causes the resistor to be heated up rather sharply by the machining. Its temperature will accordingly reach several hundred degrees C. when the machining is completed. Because of the evacuated space in which the machining is carried out the loss of heat from the heat resistor is restricted. The heated resistor can cool down in a matter of 10 seconds or so to below 100° C. even in the evacuated space if the machining is interrupted, and a two-step machining with such intervening cooling will improve the accuracy of the machining without exposing the resistor to the atmosphere. However, such improvement is not as dramatic, generally giving a tolerance of plus or minus $3/10$% with some unpredictability that may require adjustment of the calibration of the automatic control. Without such an adjustment the plus or minus $3/10$% may be centered at an average value displaced from the desired value by more than $3/10$%.

As shown in the figure, the machining of the first track 21 can begin adjacent one end of the resistor and extend towards but short of the other end, and the machining of the second track 22 can begin adjacent the other end and extend toward the termination of the first track. This more readily enables auomatic machining of both tracks without having to have the machining control remember where the first track ended. For example, a batch of resistors can be passed through an automatic machining step as described in application Ser. No. 354,649, the entire batch being then exposed to the air and cooled down, following which the batch with the individual resistors in any sequence is subjected to the second machining step. The geometry of the turns is preferably arranged so that there will be a small unmachined gap between the adjacent ends of tracks 21 and 22. The presence of such a gap improves the operation of the resistor by shifting away from the center, the point at which it develops the greatest temperature during use. It will accordingly exhibit a better dissipation of heat along the resistor body and out through the terminal closer to the displaced hot spot.

The advantages of the present invention are obtained if the first track 21 is only short enough to increase the resistance to 50% of the final desired value, but it is preferred that this track be continued until 75% of the final desired resistance is reached. A track 21 that stops at the 50% value provides the greatest benefit in high temperature operation inasmuch as the machining gap will then be very close to the center of the resistor body so that there is a minimum tendency to develop a hot spot. On the other hand in this 50% arrangement only about half the invention's maximum increase in accuracy is provided. With a first resistor track that reaches to 75% of the final desired resistance value, almost the entire accuracy increase is available along with a more limited improvement in hot spot operation. The greatest accuracy is obtained when the first track 21 provides a resistance of about 95% of the final desired value.

Because of the unpredictability of the absolute values of resistance resulting from the machining of track 21, it is not desirable to increase this 95% value significantly. Should the first track be machined to 98% of the desired resistance using control equipment not calibrated for the unpredictable shift of the average resistance value away from target, some of the resistors before track 22 is machined will turn up as having a resistance higher than the desired resistance value. The 95% target accordingly provides a comfortable margin which makes it unnecessary to calibrate the control equipment for the first track 21, and then to uncalibrate or recalibrate the equipment for track 22.

Where the interruption between the first and second machining is used only to permit the resistor to cool down without exposing it to the atmosphere, a substantial increase in accuracy is obtained when the first machining step brings the resistance up to at least about 75% of the desired final value. However, here again it is preferred to have the first machining reach about 95% of the desired final value. In either case it is also advisable to check the resistors after completion to determine whether their average value is displaced from the desired value and then calibrate the control equipment to compensate for this displacement. Such calibration can sharpen the production tolerance to plus or minus $3/10$% where it could otherwise be plus or minus $5/10$% or more.

As pointed out in applications Ser. No. 544,731 and Ser. No. 628,911, it is preferred to have the machining control respond to resistance measurement made with direct current passing through the resistor and developing a potential drop which is compared with a standard. When the machining is carried out in a single step, as described in these prior applications, it is particularly helpful to have the machining proceed along the resistor body toward a grounded terminal of the resistor. Any errors caused by the electron beam current as it returns to ground through the grounded terminal are then very slight inasmuch as the beam current passes through an almost insignificant portion of the resistive portion of the resistor. While such passage will develop a small DC potential drop, the magnitude of the drop can be less than $1/20$% of that produced by the measuring current, and such a deviation can generally be ignored. It can also be readily compensated for as by correspondingly adjusting the standard potential drop against which the measurement is compared.

With the above-described machining technique the second track 22 is machined in a direction that carries the beam away from the adjacent resistor terminal. Accordingly at the completion of that track the beam current is passing through at least about 5% of the total resistance, and this produces a DC potential error which is more significant but can also be readily compensated. This error can also be reduced as by carrying out the machining of track 22 with an electron beam of lower current magnitude—30 microamperes for example—but the beam-developed voltage can still be over 1% of the resistance-measuring voltage, and call for compensation if greater accuracy is needed. Such weaker beam currents generally call for slower machining—at rates as low as 30 inches per second—but the second track is usually quite short so that the relative slowness in machining it is not significant. Moreover at the slower machining speed the automatic terminating control provides greater accuracy inasmuch as the response time of the control need not be as short.

It is also possible to machine track 22 in the same direction, that is toward the same terminal, in which track 21 is machined. For this type of operation it is better to automatically control the machining of track 21 so that it stops before reaching a zone in which the machining gap is to be located. An automatic control of this type is shown in the above-mentioned patent, U.S. Pat. No. 3,375,342. The machining of track 22 can then be started, after the interruption at a location beyond the gap. In such an arrangement the gap may bend to run a little larger than when track 22 is machined from the opposite direction, but the beam current would, as explained above, have very little effect on the final resistance measurement. In fact with a little alteration the beam can then be used to supply all the current needed to measure the resistance and actuate the automatic control. For this purpose the batteries shown in applications Ser. No. 544,731 and Ser. No. 628,911 can be omitted and the ground connections for the measuring bridges made at the bridge corner diametrically opposed to the corner at which the beam completes the machining. The beam current reaching the layer being machined will then flow through all arms of the measuring bridge and return to ground through the grounded corner, providing a balanced voltage at the bridge corners connected to the amplifier when the resistor being machined has the desired resistance value.

Alternating current can also be used for measuring the resistance and triggering the termination of the machining, and this is particularly suitable when the resistance film is on a smooth substrate such as glazed ceramic or glass that has a fused surface. The electron beam is essentially direct current and does not interfere significantly with the AC measuring when the resistance film is not too irregular in conformation or thickness.

Resistors of the planar type can also be advantageously machined by the procedures described above inasmuch as the same heating and atmospheric exposure effects are experienced with resistor films regardless of their configuration. Such films of 25 to 95% chromium by weight, the balance being nickel, are generally preferred for high temperature use, although the further addition of 1 to 10% manganese to the nickel-chromium alloy is also helpful. Even cermet resistance layers made of mixtures of SiO and chromium have their tolerance improved when used in place of the nickel-chromium alloys.

The foregoing two-step machining technique can also be used when macining other types of circuit components such as inductors and capacitors. An inductor can for example be made by exactly the same procedure described in connection with the figure, except that inductors are generally designed to have low resistivity so that the film 12 is preferably of copper or a similar highly conductive material, and substantially thicker than that desired for chromium-nickel resistor films. Such copper films can be 1 to 10 mils thick, but it is preferred to have such copper films applied over an anchoring film of chromium or chromium-nickel containing up to about 75% nickel. The chromium or chromium-nickel films can be no more than a hundredth to a tenth of a mil thick and readily deposited by vacuum condensation. During the same vacuum condensation, a source of copper vapors can be arranged to provide the copper film so that it deposits over the lower layer. Alternatively, particularly for the heavier copper films, the substrate carrying the chromium or chromium-nickel films can be anodically treated in a copper electroplating solution to build up the desired thickness electrolytically.

Electron beam machining of copper films produces a better machined track with fewer irregularities along the track edges, when the chromium or chromium-nickel lower layer is used. Without this lower layer machining the edges of the copper on a ceramic support or on any other non-conductive support not wet by molten copper, will show numerous irregularly balled-up small copper globules which reduces the breakdown voltage between turns and also have an erratic effect on the inductance. Very smooth and accurately reproducible machining is effected through a 5 mil thick copper electroplate on a 0.05 mil chromium underlayer held on a cylindrical ceramic core, using a 250-microampere 20-kilovolt electron beam at a machining speed of 10 inches per second. An inductor made in this way has its inductance measured by an AC energized bridge during the machining, to automatically control the termination of the machining step. An intervening cooling and/or exposure to air, as in the machining of a resistor, is also helpful in increasing the accuracy of the final inductance.

The machining of capacitors in accordance with the present invention is similar to the machining of inductors, except that for capacitors the machining generally only trims down an edge of a capacitor electrode adjacent an oppositely polarized electrode. Here the beneficial effect of an underlying chromium or chromium-nickel film is even more desirable. Where the trimming extends over a sizable portion of the entire active edge, the two-step machining sequence is very helpful in reaching the exact capacitance desired. It should be noted that such trimming reduces the capacitance, and that for automatic control the control action is accordingly opposite that used for resistors and inductors. Thus in the two-step technique the first step will be terminated when about ½ or preferably ¾ to 95% of the desired capacitance drop is produced.

Obviously many modifications and variations of the present invention are possible in the light of the above teachings. It is, therefore, to be understood that within the scope of the appended claims the invention may be practiced otherwise than as specifically described.

What is claimed is:

1. In the electron beam machining of closely spaced grooves in a circuit component having an electrically conductive coating on a substrate to achieve a desired characteristic, the improvement according to which the component is exposed to the atmosphere and cooled to dissipate the machining heat after about 95% of the electron beam machining in evacuated space is completed, then continuing the electron beam machining in evacuated space while measuring the electrical characteristic of the machined coating, and terminating the machining promptly when the measurement shows the coating has reached the desired characteristic.

2. The combination of claim 1 in which the component is a resistor.

3. The combination of claim 2 in which the resistor is a cylindrical film resistor and the machining helixes through the film.

4. The combination of claim 3 in which the initial machining starts from adjacent one end of the resistor, and the final machining starts from adjacent the opposite end and extends toward the first machining.

5. The combination of claim 3 in which the initial machining starts from adjacent one end of the resistor and travels toward the other end, and the second machining starts just beyond the termination of the first machining and also travels toward said other end.

6. The combination of claim 1 in which the component machined is of the conductive film type, and the conductive film is a layer of copper on a stratum of chromium.

References Cited

UNITED STATES PATENTS

| | | | |
|---|---|---|---|
| 3,061,911 | 11/1962 | Baker | 29—620 X |
| 3,375,342 | 3/1968 | Robinson | 219—121 X |

FOREIGN PATENTS

| | | |
|---|---|---|
| 982,543 | 2/1965 | Great Britain. |

JOHN E. CAMPBELL, Primary Examiner

V. A. DI PALMA, Assistant Examiner

U.S. Cl. X.R.

29—610, 620; 219—121

UNITED STATES PATENT OFFICE
CERTIFICATE OF CORRECTION

Patent No. 3,539,309          Dated November 10, 1970

Inventor(s)     Walter Helgeland

It is certified that error appears in the above-identified patent and that said Letters Patent are hereby corrected as shown below:

Column 3, line 9, "fo" should read -- of --
Column 4, line 67, "bend" should read -- tend --
Column 5, line 29, "macining" should read -- machining --
Column 5, line 57, "reduces" should read -- reduce --

SIGNED AND
SEALED
FEB 2 1971

(SEAL)
Attest:

Edward M. Fletcher, Jr.
Attesting Officer

WILLIAM E. SCHUYLER, JR.
Commissioner of Patents